(12) United States Patent
Fujimoto et al.

(10) Patent No.: US 7,588,838 B2
(45) Date of Patent: Sep. 15, 2009

(54) ELECTROLUMINESCENCE DEVICE AND DISPLAY UNIT

(75) Inventors: Hiroshi Fujimoto, Minamiashigara (JP); Tomotake Ikada, Kanagawa-ken (JP); Kenji Takahashi, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 362 days.

(21) Appl. No.: 11/049,639

(22) Filed: Feb. 4, 2005

(65) Prior Publication Data
US 2005/0214569 A1  Sep. 29, 2005

(30) Foreign Application Priority Data
Feb. 5, 2004  (JP)  ............... 2004-029312

(51) Int. Cl.
*H01L 51/54* (2006.01)
*B05D 5/12* (2006.01)
(52) U.S. Cl. .................. 428/690; 428/917; 427/66; 257/98; 313/504; 313/506; 252/301.16
(58) Field of Classification Search .......... 428/690, 428/917; 313/502–509; 427/58, 66; 257/40, 257/88–103, E51.001–E51.052; 252/301.13–301.35
See application file for complete search history.

(56) References Cited

U.S. PATENT DOCUMENTS

| | | | |
|---|---|---|---|
| 5,273,774 A | | 12/1993 | Karam et al. |
| 5,309,071 A | * | 5/1994 | Karam et al. ............... 313/509 |
| 2004/0119400 A1 | | 6/2004 | Takahashi et al. |
| 2004/0256601 A1 | * | 12/2004 | Hubacek et al. ............. 252/500 |
| 2005/0062395 A1 | * | 3/2005 | Takahashi et al. ........... 313/467 |
| 2005/0140271 A1 | * | 6/2005 | Ikada et al. ................. 313/503 |

FOREIGN PATENT DOCUMENTS

JP  WO02080626  * 10/2002

OTHER PUBLICATIONS

Toshio Inoguchi, "Electroluminescent Display", first edition, Sangyo-Tosho, Ltd., Jul. 25, 1991.

* cited by examiner

*Primary Examiner*—Dawn Garrett
(74) *Attorney, Agent, or Firm*—Sughrue Mion, PLLC

(57) ABSTRACT

Providing a particle distributed electroluminescent device which is improved in luminescent color control, prevention of luminescent color change over time and heavy circuit load, and/or representation of a delicate gradation sequence, as well as capable of providing high brightness and luminous efficiency, and a display unit using such an electroluminescence device. Two types of luminescent particles, each having a dielectric core and a fluorescent coating layer are used as luminescent particles distributed in a luminescent layer of a particle distributed electroluminescence device. The dielectric cores of the two types of luminescent particles are formed of dielectric materials having different dielectric constants with each other.

14 Claims, 3 Drawing Sheets

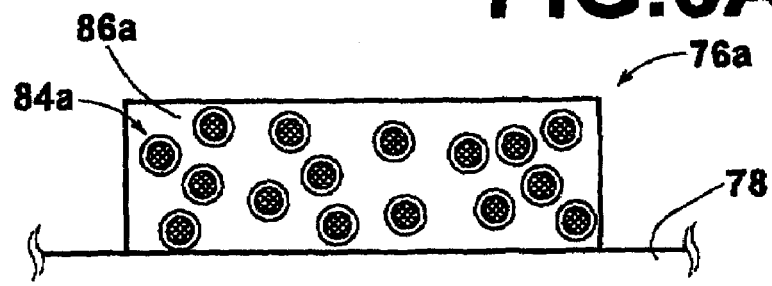
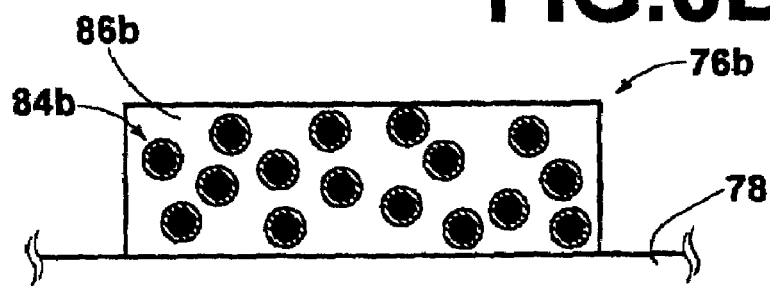
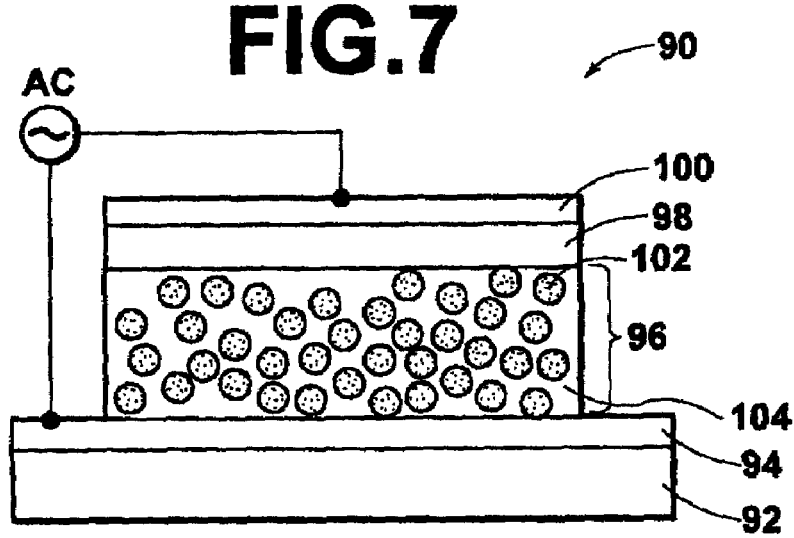

ELECTROLUMINESCENCE DEVICE AND DISPLAY UNIT

BACKGROUND OF THE INVENTION

1. Field of the Invention

The present invention relates to an electroluminescence device and display unit. More specifically, the present invention relates to an electroluminescence device having a distributed type of structure in which electroluminescent particles, each having a fluorescent material, are distributed in a luminescent layer, and a display unit using such an electroluminescence device.

2. Description of the Related Art

The electroluminescence device is a prospective device for use as a self-luminescent surface light source in a new display unit and similar devices that require no additional light source. Two types of electroluminescence devices are known, one of which is referred to as "particle distributed type" and other is referred to as "thin film type". The particle distributed type has a luminescent layer having fluorescent particles freely distributed in a dielectric binder. The thin film type has a luminescent layer formed in a thin film of a fluorescent material through a vacuum deposition process or the like. Of the two types, the particle distributed electroluminescence device is superior to the thin film electroluminescence device, in that it is manufactured through a simple manufacturing process that involves no vacuum deposition, which allows a low manufacturing cost, and manufacture of a large-sized device and even a flexible device having flexibility.

The basic structure of the particle distributed electroluminescence device as described, for example, in a non-patent document entitled "Electroluminescent Display" by Toshio Inoguchi, first edition, Sangyo-Tosho, Ltd., Jul. 25, 1991 is identical to that of a device 90 shown in FIG. 7. It has a transparent substrate 92 made of a glass or polyethylene terephthalate (PET) sheet having a transparent electrode 94 thereon formed in a layer of a transparent conductive material. It also has a luminescent layer 96, an insulation layer 98, and a back plate electrode 100 stacked on the electrode layer 94. In addition, additional layers, such as a surface protection layer, may also be provided. The luminescent layer 96 has fluorescent particles 102 freely distributed in a dielectric binder 104. When an AC voltage is applied between the transparent electrode 94 and back plate electrode 100, the fluorescent particles embedded in the luminescent layer 96 produce electroluminescent emissions, and the electroluminescent emissions produced in this manner exit through the transparent electrode 94 and transparent substrate 92. The insulation layer 98 is provided for blocking the current path so that a high voltage is applied stably to each of the fluorescent particles 102. However, the insulation layer 98 may not be required if the fluorescent particles 102 are distributed in complete freedom and a current path within the luminescent layer 96 is blocked off.

The luminescent color produced by the device is dependent on the type of the fluorescent particles used. Fluorescent particles that produce different luminescent colors may be mixed together to obtain a desired color, such as white. Dyestuffs and pigments may also be used to adjust the luminescent color. Further, the construction of so called "dual pattern system" or "triple pattern system" in which luminescent sections having particles that produce different luminescent colors are arranged two-dimensionally in parallel may also be employed. Still further, a plurality of structures identical to that shown in FIG. 7, each using a different type of fluorescent particles that produce a different luminescent color may be stacked in layers with all the intermediate electrodes made transparent. Thus, the electroluminescence device may provide multicolor representation so that it may be applied to color displays and similar devices.

As for the fluorescent particles for the particle distributed electroluminescence device, particles, such as ZnS:Cu, Cl, in which activators are added to the base material, are used in the typical known devices. The elements added as activators act as donors and accepters, and the device may produce luminescent emissions through recombination of these donors and accepters. For example, in the case of ZnS:Cu, Cl, Cl acts as donors and Cu acts as accepters. In the mean time, U.S. Patent Application Publication No. 20040119400 proposes an electroluminescence device which is identical in construction to that shown in FIG. 7, but employs fluorescent materials such as ZnS:Mn and others in particle form, which have conventionally been used for the luminescent layer of the thin film electroluminescence device as freely distributed fluorescent particles within the luminescent layer. In these devices, electrons are injected into the fluorescent sections from the interface between the fluorescent sections and dielectric sections surrounding thereof or from the trap and the like within the fluorescent sections. It is presumed that the similar mechanism to that of the conventional thin film device for producing luminescent emissions is realized through the collision excitation of the luminescence centers within the fluorescent sections by the hot electrons produced by the acceleration of these electrons. The basic structure of the device is identical to that of the conventional particle distributed electroluminescence device, so that the manufacturing cost may be kept low.

Here, as described above, the particle distributed electroluminescence device is superior to the thin film electroluminescence device in manufacturing cost, etc., but is inferior in brightness and the like. For this reason, various efforts have been made for realizing a particle distributed electroluminescence device having greater brightness and luminous efficiency, while maintaining advantages, such as a low manufacturing cost. As one of the examples of such efforts, U.S. Patent Application Publication No. 20040119400 proposes a particle distributed electroluminescence device that uses fluorescent particles comprising a dielectric core and a fluorescent coating layer, and also particles further provided with a dielectric layer covering the fluorescent coating layer so that the electric field is applied to the fluorescent coating layer effectively by the effect of the dielectric core.

However, known particle distributed electroluminescence devices have drawbacks, such as limited freedom in controlling the luminescent color for realizing a desired color, luminescent color change over time due to deterioration of the device, heavy circuit load when applied to multicolor representation, and the like.

That is, in controlling the luminescent color of the particle distribute electroluminescence device that uses the mixture of fluorescent particles that produce different luminescent colors for obtaining a desired color such as white, if the drive voltage is changed to adjust the brightness, the color is also changed due to the fact that, in general, each type of the particles has different voltage-brightness characteristics. This has caused a problem that the desired color is not obtained under various driving conditions and over a wide rage of brightness. Further, when the luminescent color is adjusted using dyestuffs or pigments, the amount of dyestuffs or pigments is determined according to a particular level of brightness, so that the color is changed significantly here also when the brightness is adjusted. Again, this has caused the problem that the desired color is not obtained under various driving conditions and over a wide rage of brightness.

For the change in the luminescent color over time due to deterioration of the device, when the mixture of fluorescent particles that produce different luminescent colors are used to obtain a desired color, the color changes over time due to the difference in deterioration pattern of the emission lifetime among the particles. Devices constructed with luminescent sections having particles that produce different luminescent colors arranged in parallel or stacked in layers has the same problem due to the difference in deterioration pattern of the emission lifetime among the particles used in each of the luminescent sections. Further, when the luminescent color is adjusted using dyestuffs or pigments, the difference in deterioration characteristics of the fluorescent materials due to electrical factors and the difference in deterioration characteristics of the dyestuffs or pigments due to optical factors such as ultraviolet rays cause here also the change in the luminescent color over time.

For the heavy circuit load when applied to multicolor representation, the difference in voltage-brightness characteristics among the particles used in each of the luminescent sections for each color causes the difference in voltage level applied to respective luminescent sections, resulting in increased circuit load.

Further, when fluorescent particles having sharp response in the voltage-brightness characteristics, or those having a dielectric core with a fluorescent coating layer are used in the particle distributed luminescence device in order to obtain high brightness and luminous efficiency, a small adjustment of the voltage causes a significant change in the brightness of the luminescence, thereby causing the problem that the representation of a delicate gradation sequence is difficult to obtain.

SUMMARY OF THE INVENTION

The present invention has been developed in view of the circumstances described above, and it is an object of the present invention to provide a particle distributed electroluminescence device which is improved in the luminescent color control, prevention of luminescent color change over time and heavy circuit load, and/or representation of a delicate gradation sequence, as well as capable of providing high brightness and luminous efficiency, while maintaining advantages of the conventional particle distributed electroluminescence device, such as a low manufacturing cost, and a display unit using such an electroluminescence device.

A first electroluminescence device of the present invention comprises:

a luminescent layer having a multitude of electroluminescent particles distributed in a binder, the particles forming at least a first particle group and a second particle group; and electrodes for applying a voltage to the luminescent layer, wherein each of the electroluminescent particles forming the first particle group comprises a dielectric core having a first dielectric constant and a fluorescent coating layer made of a first fluorescent material, and each of the electroluminescent particles forming the second particle group comprises a dielectric core having a second dielectric constant which is different from the first dielectric constant and a fluorescent coating layer made of a second fluorescent material.

Here, the referent of "electroluminescent particle" as used herein means an entire particle composite of each of the electroluminescent particles distributed in the luminescent layer of the electroluminescence device. That is, the entire particle composite including the dielectric core, and dielectric layer, buffer layer and the like if any is referred to herein as "electroluminescent particle" or simply as "luminescent particle", although the electroluminescent emissions are actually produced by the fluorescent section of the particle.

Further, the referent of "distributed" in the context of "a multitude of electroluminescent particles distributed in a binder", does not necessarily mean that each of the electroluminescent particles is distributed in complete freedom and may include the state in which a portion or all of the electroluminescent particles are adjoined with each other.

Still Further, the description has been made that the first electroluminescence device of the present invention comprises the luminescent layer and electrodes. But the description indicates only the requisite minimum of the layer structure, and it may further include an insulation layer or layers provided on either or both sides of the luminescent layer, in addition to a buffer layer, a surface protection layer and the like. In particular, when a portion or all of the electroluminescent particles are adjoined with each other, it is preferable that the insulation layer or layers be provided.

Further, description has been made that in the first electroluminescence device, each of the electroluminescent particles forming the first and second particle groups has a dielectric core and a fluorescent coating layer. But the description indicates only the requisite minimum here also. For example, additional layers, such as a buffer layer and the like may be provided between the dielectric core and the fluorescent coating layer, and additional layers such as a surface protection layer and the like may be provided outside of the fluorescent coating layer.

Further, in the first electroluminescence device of the present invention, the first and second fluorescent materials may be fluorescent materials that produce different luminescent colors or the same color. Here, the "materials that produce the same luminescent color" may be the same or different fluorescent materials that produce the same luminescent color.

Still Further, in the first electroluminescence device of the present invention, a dielectric coating layer may further be provided outside of the fluorescent coating layer made of the first fluorescent material and/or outside of the fluorescent coating layer made of the second fluorescent material. In this case, additional layers, such as a buffer layer may be provided between the dielectric core and fluorescent coating layer, or between the fluorescent coating layer and dielectric coating layer, and additional layers such as a surface protection layer and the like may be provided outside of the dielectric coating layer.

A second electroluminescence device of the present invention comprises:

at least two luminescent layers arranged in parallel or stacked in layers that produce different luminescent colors with each other; and electrodes for applying voltages to the at least two luminescent layers separately, wherein a first luminescent layer of the at least two luminescent layers has a multitude of electroluminescent particles distributed in a binder, the particles forming at least a first particle group, and each of the electroluminescent particles forming the first particle group comprising a dielectric core having a first dielectric constant and a fluorescent coating layer made of a first fluorescent material, and a second luminescent layer of the at least two luminescent layers has a multitude of electroluminescent particles distributed in a binder, the particles forming at least a second particle group, and each of the electroluminescent particles forming the second particle group comprising a dielectric core having a second dielectric constant which is different from the first dielectric constant and a fluorescent coating layer made of a second fluorescent material that produces a luminescent color which is different from that of the first fluorescent material.

Here, the description has been made that the second electroluminescence device of the present invention comprises at least two luminescent layers and electrodes. But the description indicates only the requisite minimum of the layer structure here also, and it may further include an insulation layer or layers provided on either or both sides of each of the luminescent layers, in addition to a buffer layer, a surface protection layer and the like. In particular, when a portion or all of the electroluminescent particles are adjoined with each other, it is preferable that the insulation layer or layers be provided. Also, sections of the electrodes for applying a voltage to the respective luminescent layers may be physically separated with each other or a part of the voltage supplying structure for applying the voltage may be shared by a plurality of luminescent layers.

Further, it has also been described that in the second electroluminescence device of the present invention, each of the electroluminescent particles forming the first and second particle groups comprises a dielectric core and a fluorescent coating layer. But the description indicates only the requisite minimum here also. For example, additional layers, such as a buffer layer and the like may be provided between the dielectric core and the fluorescent coating layer, and additional layers such as a surface protection layer and the like may be provided outside of the fluorescent coating layer.

Still Further, in the second electroluminescence device of the present invention, a dielectric coating layer may further be provided outside of the fluorescent coating layer made of the first fluorescent material and/or outside of the fluorescent coating layer made of the second fluorescent material. In this case also, additional layers, such as a buffer layer may be provided between the dielectric core and fluorescent coating layer, or between the fluorescent coating layer and dielectric coating layer, and additional layers such as a surface protection layer and the like may be provided outside of the dielectric coating layer.

A display unit of the present invention has a display comprising a multitude of electroluminescence devices of any one of the types described above arranged two-dimensionally. In this respect, the display unit of the present invention may include a display unit in which a part of the voltage supplying structure including electrodes for applying voltage is shared by a plurality of electroluminescence devices arranged two-dimensionally.

In the first electroluminescence device of the present invention, each of the electroluminescent particles forming the first and second particle groups has a dielectric core and a fluorescent coating layer. This composite structure of the particle allows the voltage applied to the luminescent layer to be concentrated on the fluorescent section of the luminescent layer more effectively compared with an electroluminescent particle formed only of a fluorescent material, thereby luminescent emissions of higher brightness and efficiency may be obtained. In addition, dielectric cores used for the first and second particle groups have different dielectric constants, so that the voltage application efficiencies for the fluorescent coating layers may be adjusted separately for the first and second particle groups. This allows greater freedom in adjusting the luminescent color, prevention of the change in luminescent color over time due to the deterioration of the device during a prolonged use, and/or realization of a delicate gradation sequence. Further, the first electroluminescence device of the present invention may be manufactured through a simple manufacturing process that involves no vacuum deposition, as with the conventional particle distributed electroluminescence device, so that it may provide the advantageous effects described above, while maintaining the advantages of the conventional particle distributed electroluminescence device, such as a low manufacturing cost and the like.

In particular, if the first fluorescent material used for the first particle group and that used for the second particle group are the materials that produce different luminescent colors with each other, a desired color such as white may be obtained through an appropriate selection of each of the fluorescent materials. In this case, the particle groups may have substantially identical apparent voltage-brightness characteristics by selecting a dielectric core having an appropriate dielectric constant in accordance with the fluorescent material of each of the particle groups. This allows a desired luminescent color to be produced under various driving conditions and over a wide range of brightness. Here, the referent of "apparent voltage-brightness characteristics" means brightness characteristics of the luminescence of each of the particle groups for the voltage applied to the entire luminescent layer. Again, by selecting an appropriate dielectric core for each of the particle groups, the effectiveness of the voltage applied to the fluorescent coating layer of the particle of each of the particle groups may be adjusted such that the respective fluorescent materials used for the respective particle groups may have a substantially identical deterioration pattern of the emission lifetime, thereby the change in the luminescent color over time may be prevented.

In the mean time, in the first electroluminescence device of the present invention, if the first and second fluorescent materials are the material or materials that produce the same luminescent color, a dielectric core having an appropriate dielectric constant may be selected for each of the particle groups so that the change in the brightness of the luminescence of entire luminescent layer becomes moderate for the change in the voltage applied to the luminescent layer. Thus, the first electroluminescence device of the present invention may be an electroluminescence device that allows the representation of a delicate gradation sequence, while maintaining high maximum brightness.

Further, in the first electroluminescence device of the present invention, if a dielectric coating layer is further provided outside of the fluorescent coating layer of each of the electroluminescent particles forming the first particle group and/or the second particle group, the fluorescent materials, which are, in general, sensitive to damp and moisture, may be protected from the ambient moisture, thereby the operating life of the device may be extended.

The second electroluminescence device of the present invention has at least two luminescent layers for producing different luminescent colors with each other, and each of the electroluminescent particles forming the first and second particle groups contained in the first and second luminescent layers of the at least two luminescent layers has a dielectric core and a fluorescent coating layer. Here again, this composite structure of the particle allows the voltage applied to the luminescent layers to be concentrated on the fluorescent section of the luminescent layers more effectively compared with an electroluminescent particle formed only of a fluorescent material, thereby multicolor representation of higher brightness and efficiency may be obtained. In addition, dielectric cores used for the first and second particle groups have different dielectric constants, so that the voltage application efficiencies for the fluorescent coating layers of the respective particle groups may be adjusted separately such that the respective luminescent layers have a substantially identical deterioration pattern of the emission lifetime by selecting appropriate dielectric cores for the respective particle groups. This allows the change in the luminescent color over time to be prevented, and longstanding desired multicolor representation may be obtained. In addition, the respective luminescent layers may have substantially identical apparent voltage-brightness characteristics by selecting a dielectric core having an appropriate dielectric constant in accordance with the fluorescent material for each of the particle groups. This allows the voltage levels applied to respective luminescent layers correspond substantially with each other, thereby circuit load may be controlled.

Further, in the second electroluminescence device of the present invention, a mixture of a plurality of different types of electroluminescent particles having dielectric cores with different dielectric constants with each other may be used in each luminescent layer. In this case, greater freedom in luminescent color control, prevention of luminescent color change over time, and/or the representation of a delicate gradation sequence may be allowed for each color which is an element of the multicolor representation.

Still further, the second electroluminescence device of the present invention may be manufactured through a simple manufacturing process that involves no vacuum deposition, as with the conventional particle distributed electroluminescence device, so that it may provide the advantageous effects described above, while maintaining the advantages of the conventional particle distributed electroluminescence device, such as a low manufacturing cost and the like.

Further, in the second electroluminescence device of the present invention, if a dielectric coating layer is further provided outside of the fluorescent coating layer of each of the electroluminescent particles forming the first particle group and/or the second particle group, the fluorescent material, which is, in general, sensitive to damp and moisture, may be protected from the ambient moisture, thereby the operating life of the device may be extended.

The display unit of the present invention has a display comprising a plurality of electroluminescence devices of any one of the types described above arranged two-dimensionally, thus it may receive full benefits similar to those described above in relation to the electroluminescence device of the present invention.

BRIEF DESCRIPTION OF THE DRAWINGS

FIG. 6A is an enlarged sectional view of the display shown in FIG. 5 illustrating the respective luminescent elements contained therein.

FIG. 6B is an enlarged sectional view of the display shown in FIG. 5 illustrating the respective luminescent elements contained therein.

FIG. 7 is sectional view of a conventional particle distributed electroluminescence device illustrating the basic structure thereof.

DESCRIPTION OF THE PREFERRED EMBODIMENTS

Hereinafter, exemplary embodiments of the present invention will be described in detail with reference to accompanying drawings.

A first embodiment of the present invention will be described by referring to FIGS. 1 and 2.

Figure 1:
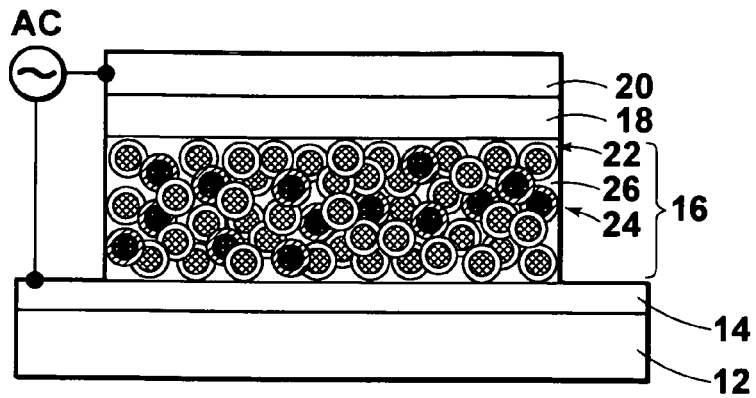
FIG. 1 is a sectional view of the electroluminescence device according to a first embodiment of the present invention illustrating the structure thereof.

The electroluminescence device 10 according to the first embodiment of the present invention shown in FIG. 1 comprises a transparent substrate 12, a transparent electrode 14, a luminescent layer 16, insulation layer 18, and a back plate electrode 20. The relative thickness of each of the layers shown in the drawing is illustration purposes only, and does not necessarily reflect the actual relative thickness. In particular, the thickness of the luminescent layer 16 is enlarged disproportionately in the drawing to facilitate the description.

Figure 2A:
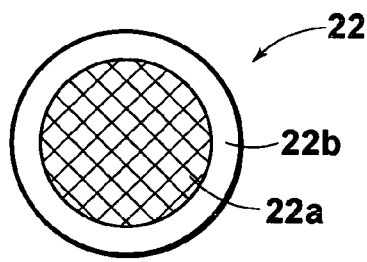
FIG. 2A is a sectional view of the electroluminescent particle used in the device shown in FIG. 1.
Figure 2B:
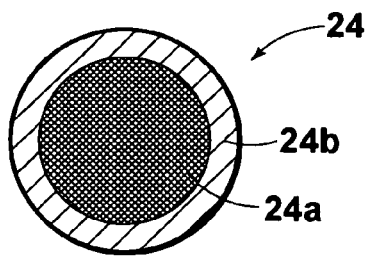
FIG. 2B is a sectional view of the electroluminescent particle used in the device shown in FIG. 1.

The structure of the luminescent layer 16 will be described first. The luminescent layer 16 has two different types of electroluminescent particles 22 and 24 distributed in a binder 26 in multitude. As shown in FIG. 2A, a first luminescent particle 22 has a dielectric core 22a and a fluorescent coating layer 22b. A second luminescent particle 24 has a dielectric core 24a and a fluorescent coating layer 24b as shown in FIG. 2B. The dielectric cores 22a and 24a are made of dielectric materials having different dielectric constants with each other. In addition, in the present embodiment, the fluorescent coating layers 22b and 24b are made of fluorescent materials that produce different luminescent colors with each other.

The fluorescent materials used for forming the fluorescent coating layers 22b and 24b are selected from one of the material pairs that produce a desired color. Preferred fluorescent materials include, for example, ZnS:Mn, $Zn_2SiO_4$:Mn, $BaAl_2S_4$:Eu, $CaAl_2O_4$:Eu, $MgGa_2O_4$:Eu, CaS:Eu, ZnS:Eu, $Y_2O_3$:Eu, $Ga_2O_3$:Mn, $Ga_2O_3$:Eu, $CaGa_2O_4$:Eu, $Ga_2O_3$:Cr, SrS:Ce, ZnS:Tb, F, SrS:Ce, Eu, ZnS:Sm, Cl, $CaGa_2S_4$:Ce, ZnS:Cu, Cl, and ZnS:Ag, Al. Of these, $BaAl_2S_4$:Eu, ZnS:Cu, Cl and ZnS:Ag, Al are particularly preferred as the fluorescent materials for producing blue luminescence. $Zn_2SiO_4$:Mn and ZnS:Tb, F are particularly preferred as the fluorescent materials for producing green luminescence. ZnS:Mn, $MgGa_2O_4$:Eu, and CaS:Eu are particularly preferred as the fluorescent materials for producing red luminescence. Preferably, a combination of materials is selected from among the fluorescent materials described above for producing a desired color. In general, respective fluorescent materials selected have different voltage-brightness characteristics, and/or deterioration patterns of emission lifetime with each other. The mixture ratio of the first luminescent particles 22 and second luminescent particles 24 is selected so that a desired color is obtained.

The dielectric materials forming the dielectric cores 22a and 24b are selected based on the difference in voltage-brightness characteristics and/or a deterioration pattern of the emission lifetime between the fluorescent materials forming the respective fluorescent coating layers 22b and 24b, and have appropriate dielectric constants so that the particle group of the first luminescent particles 22 and particle group of the second luminescent particles 24 have substantially identical apparent voltage-brightness characteristics for the voltage applied to the entire luminescent layer 16 comprising the particle group of the first luminescent particles 22 and particle group of the second luminescent particles 24, and/or a deterioration of the emission lifetime of the fluorescent materials forming the fluorescent coating layers 22b and 24b. For example, if the fluorescent material forming the first fluorescent coating layer 22b produces lower brightness than the fluorescent material forming the second fluorescent coating layer 24b for the same voltage, a dielectric material having a greater dielectric constant than that of the material forming the second dielectric core 24a may preferably be used for the first dielectric core 22a. Note that, however, an excessive difference in dielectric constant between the first and second dielectric cores may cause unstable operation of the device 10. Preferably, the difference in dielectric constant between them is less than or equal to hundred times, and more preferably less than or equal to fifty times. Preferably the dielectric constant of the dielectric cores 22a and 24a is five times greater, and more preferably ten times greater than that of the fluorescent coating layers 22b and 24b respectively, in order for the voltage applied to the luminescent layer to be concentrated on the fluorescent coating layers 22b and 24b effectively. Preferably, the absolute value of the dielectric constant of the dielectric cores 22a and 14a is at least around 100 in terms of the relative dielectric constant. Here, dielectric materials having different chemical formulae or those having the same chemical formula but have different crystalline structures so that they have different dielectric constants may be used as the dielectric materials having different dielectric constants with each other used for the first and second dielectric cores 22a and 22b. Preferable dielectric materials include, for example, $BaTa_2O_6$, $BaTiO_3$, $SrTiO_3$, $Y_2O_3$, $TiO_2$, $PbTiO_3$, $Al_2O_3$, ZnS, $ZrO_2$, and $PbNbO_3$.

Adjustment of the ratio of the thickness of the fluorescent coating layer and the diameter of the dielectric core of each of the first luminescent particles 22 and second luminescent particles 24, in addition to the selection of the respective dielectric materials for forming the respective dielectric cores 22a and 24a may result in more accurate correspondence in apparent voltage-brightness characteristics between the particle group of the first luminescent particles 22 and that of the second luminescent particles 24, and/or in deterioration pattern of the emission lifetime between the fluorescent materials forming the fluorescent coating layers 22b and 24b.

Preferably, the core diameter of the dielectric cores 22a and 22b is in the range from 0.05 µm to 5 µm, more preferably from 0.1 µm to 3.5 µm. Unduly small core diameter of the dielectric core may cause problems. For example, the thickness of the fluorescent coating layer needs to be made excessively small in order for the voltage to be concentrated thereon. Conversely, unduly large core diameter of the dielectric core may cause problems. For example, the entire luminescent particle composite becomes too large to maintain the smoothness of the luminescent layer 16. Preferably, the layer thickness of the fluorescent coating layers 22b and 24b is greater than or equal to 0.05 µm, and more preferably greater than or equal to 0.1 µm. A smaller layer thickness than this may cause the structure required for the fluorescent emission to become unstable, and the brightness of the luminescence is reduced significantly.

Each of the luminescent particles 22 and 24 comprising the dielectric core and fluorescent coating layer described above may be produced by the liquid phase method (e.g., precipitation, evaporative decomposition, inverted micelle, urea fusion, freeze-drying) or gas phase method (e.g., CVD, plasma, sputtering, resistance heating, electron beam, and combined method of either of these methods with fluidized bed deposition). In addition, a method in which particles of fluorescent material are produced by the inverted micelle, which are then attached to the surface of the dielectric particle having a high dielectric constant to be used as the dielectric core. Also, the basic particle produced by one of the methods described above may be further heat-treated to provide luminescent centers of the fluorescent coating layer, or to control the crystalline structure of the fluorescent coating layer.

As for the materials of the binder 26 of the luminescent layer 16, dielectric materials, such as cyanoethyl cellulose resin, epoxide resin, polyethylene, polypropylene, polystyrene resin, silicone resin, polyvinylidene fluoride and the like may be used. In addition, a material with the adjusted dielectric constant produced by mixing particles having a high dielectric constant, such as $BaTiO_3$, SrTiO3, and the like, in these materials may also be used. Alternatively, inorganic binders, such as silicon oxide and aluminum oxide may also be used. Preferably, the binder 26 has a dielectric constant which is at least greater than or equal to ½ of the dielectric constant of the fluorescent materials forming the respective fluorescent coating layers 22b and 24b.

Preferably, the entire thickness of the luminescent layer 16 is greater than or equal to 1 µm from the view point of preventing short circuiting of the device, and smaller than or equal to 100 µm from the viewpoint of power consumption. More preferably, the thickness of the luminescent layer 16 is in the range from 3 µm to 50 µm. The luminescent layer 16 may be formed by a relatively simple method, such as coating, screen printing, or the like, using a paste made of the luminescent particles 22 and 24 distributed in the solution of the material of the binder 26 described above.

Next, the composition of each layer of the device 10 except for the luminescent layer 16 will be described. As for the material of the transparent substrate 12, a flexible material, such as a polyethylene terephthalate (PET) sheet, or a glass substrate, such as valium borocylicate glass, aluminosilicate glass, and the like may be used.

As for the material of the transparent electrode 14, materials consisting primarily of ITO (indium titanium oxide), ZnO:Al, $Zn_2In_2O_5$, $(Zn,Cd,Mg)O$—$(B,Al,Ga,In,Y)_2O_3$—$(Si,Ge,Sn,Pb,Ti,Zr)O_2$, $(Zn,Cd,Mg)O$—$(B,Al,Ba,In,Y)_2O_3$—$(Si,Sn,Pb)O$, $MgO$—$In_2O_3$, or GaN or $SnO_2$ materials may be used.

As for the material of the insulation layer 18, for example, $BaTiO_3$, $Y_2O_3$, $Ta_2O_5$, $BaTa_2O_6$, $TiO_2$, $Sr(Zr,Ti)O_3$, $SrTiO_3$, $PbTiO_3$, $Al_2O_3$, $Si_3N_4$, ZnS, $ZrO_2$, $PbNbO_3$, $Pb(Zr,Ti)O_3$ may be used. Preferably, the material of the insulation layer 18 has a high dielectric constant and high resistance property against dielectric breakdown. The insulation layer 18 may be formed by a simple method, such as coating, screen printing or the like, using a paste of the materials described above in particle forms distributed therein, as with the luminescent layer 16. Preferably, the thickness of the insulation layer 18 is less than or equal to 50 µm, and more preferably less than or equal to 30 µm in order to keep the power consumption low at the insulation layer 18.

As for the back plate electrode 20, a metal electrode, such as aluminum and the like, or an electrode formed by coating a carbon paste may be used.

Hereinafter, the operation and function of the electroluminescence device 10 will be described. When an AC voltage is applied between the transparent electrode 14 and back plate electrode 20, recombination of donors and accepters, or collision excitation of the luminescent centers by hot electrons occurs within the fluorescent coating layer 22b and 24b of the luminescent particles 22 and 24, thereby luminescent emissions are produced. The luminescent emissions produced in this manner exit from the downside of the drawing in FIG. 1 through the transparent electrode 14 and transparent substrate 12.

When the luminescent emissions are produced, the voltage applied to the luminescent layer 16 is concentrated on the fluorescent coating layers 22b and 24b effectively by the effect of the dielectric cores 22a and 24a, so that luminescence of high brightness and efficiency may be obtained. If the dielectric materials for forming the dielectric cores 22a and 24a are selected such that the particle group of the first luminescent particles 22 and the particle group of the second luminescent particles 24 have substantially identical apparent voltage-brightness characteristics, a desired luminescent color may be obtained under various driving conditions and over a wide range of brightness. In addition, if the dielectric materials for forming the dielectric cores 22a and 24a are selected such that the fluorescent materials for forming fluorescent coating layers 22b and 24b have a substantially identical deterioration pattern of the emission lifetime, the change in the luminescent color over time may be prevented and a desired luminescent color may be obtained over a prolonged period of time.

Next, the verification test results of the aforementioned operation and function will be described. The test was conducted using an example device of the device 10 shown in FIG. 1 and devices of comparative examples actually created.

The example device of the device 10 was created in the following manner.

First, as for the transparent electrode 14, a conductive layer of $In_2O_3$, $SnO_2$ or the like was formed through sputtering on a transparent substrate 12 made of a PET sheet of 350 μm thickness.

As for the electroluminescent particle 22, a particle A comprising a dielectric core 22a of $BaTiO_3$ (Barium titanate) with an average core diameter of 0.5 μm and a fluorescent coating layer 22b of ZnS:Mn was used. The particles A were formed through the following steps. $BaTiO_3$ particles, each having an average core diameter of 0.5 μm, were treated by the evaporative decomposition together with a mixed solution of a sulfur compound, such as zinc acetate, thioacetamide or the like and manganese acetate. Then, they were annealed for about 2 hours at 900 degrees Celsius. Finally, they were rinsed and dried. As for the electroluminescent particle 24, a particle B comprising a dielectric core 24a of $BaTiO_3$ with an average core diameter of 1.0 μm and a fluorescent coating layer 24b of ZnS:Cu was used. The particles B were formed through the following steps. $BaTiO_3$ particles, each having an average core diameter of 1.0 μm, were treated by the evaporative decomposition together with a solution of a sulfur compound, such as zinc acetate, thioacetamide or the like. Then, they were baked for about 4 hours at 700 degrees Celsius together with copper sulfide powders. Then they were rinsed and dried, and finally sifted to remove agglutinated particles. The relative dielectric constants of the dielectric core 22a of the particle A (electroluminescent particle 22) and the dielectric core 24a of the particle B (electroluminescent particle 24) were 2000 and 5500 respectively. Here, the difference in dielectric constant developed between the dielectric cores 22a and 24a made of the same material of $BaTiO_3$ arises from the difference in crystalline structure. In general, materials, such as $BaTiO_3$ and the like, change their crystalline structures according to the composing conditions including temperature. They have a tendency that their crystalline structures become unstable with decrease of the particle size. The examination of the particles A and B under the scanning electron microscope showed that they were not of a particle with a smooth surface, but the ZnS:Mn or ZnSCu forming the fluorescent coating layer was adhered to the core irregularly with the irregularity of about 0.1 to 0.2 μm.

The particles A and B formed in the manner described above are mixed together in the mixture ratio of 2:3 in weight to obtain white luminescence. Then the mixture was distributed in the solution of the cyanoethyl pullulan, which is the material of the binder 26, dissolved in the solvent of N,N'-dimethyl formaldehyde. This was coated with a layer thickness of 15 μm on the transparent electrode 14. Then, a paste of $BaTiO_3$ particles having the average core diameter of 200 nm distributed in the mixed solution of cyanoethyl polyvinyl alcohol and cyanoethyl pullulan was coated on the luminescent layer 16 with a layer thickness of 20 μm to form the insulation layer 18. Finally, as the back plate electrode 20, an aluminum sheet of 50 μm thickness was placed on the insulation layer 18 and thermocompressed by a heat roller. Hereinafter, the example device of the electroluminescence device 10 shown in FIG. 1, which was produced in the manner described above, will be referred to as the Device of Example 1.

As for the comparative examples, two devices were further produced.

For the Device of Comparative Example 1, particles C, each comprising a dielectric core of $BaTiO_3$ having the same relative dielectric constant of 2000 as the particle A and a fluorescent coating layer of ZnS:Cu, was used instead of particle B. The particles A and C were mixed together in the mixture ratio of 1:4 in weight to form a luminescent layer. All the other layers and others were formed in the same manner as in the Device of Example 1. That is, the Device of Comparative Example 1 has a luminescent layer in which two different types of electroluminescent particles are distributed, each type of the particles having a fluorescent coating layer made of a different material with each other and a dielectric core made of the same dielectric material having the same dielectric constant. The particles C were formed through the following steps. $BaTiO_3$ particles, each having an average core diameter of 0.5 μm, were treated by the evaporative decomposition together with a solution of a sulfur compound, such as zinc acetate, thioacetamide or the like. Then, they were baked for about 4 hours at 700 degrees Celsius together with copper sulfide powders. Then, they were rinsed and dried, and finally sifted to remove agglutinated particles.

The Device of Comparative Example 2 uses two different types of particles D and E, which were made only of fluorescent materials without dielectric cores, as the electroluminescent particles, and was created by the similar method described above. Each of the particles D is a fluorescent particle with an average particle diameter of 8 μm made of ZnS:Mn. The particles D were produced through the following steps. Manganese acetate and copper chloride were added to high-purity ZnS particles and mixed. Then, the mixture was baked for 4 hours at 1100 degrees Celsius under the argon gas atmosphere. Each of the particles E is a fluorescent particle with an average particle diameter of 15 μm made of ZnS:Cu, Cl. The particles E were produced through the following steps. Copper sulfate is added to high-purity ZnS particles and mixed, and sodium chloride and magnesium chloride were further mixed as fluxes. Then, the mixture was baked for 4 hours at 1200 degrees Celsius. Thereafter, the particles were rinsed and dried, and ball milled with alumina beads having an average particle diameter of 0.5 mm. Then, they were baked again for 4 hours at 700 degrees Celsius, and rinsed and dried. The mixture ratio of the particles D and E was 1:4 in weight.

The amount of fluorescent material was adjusted among the Device of Example 1, Device of Comparative Example 1, and Device of Comparative Example 2 so that they have the same amount of florescent material per unit area of the luminescent layer.

The brightness of the luminescence was examined for the Device of Example 1, Device of Comparative Example 1, and Device of Comparative Example 2 produced in the manner described above by driving the devices with an AC power source of 200V, 1 KHz. The table 1 summarizes the results, which shows relative values with reference to the value of the Device of Example 1.

TABLE 1

| Device name | Luminescent particle used | Relative brightness (200 V, 1 KHz drive) | Relative brightness after duration of test (100 cd/m², 1 KHz drive) | Color change after duration of test (100 cd/m², 1 KHz drive) |
|---|---|---|---|---|
| Example 1 | A + B (2:3 in weight) | 1 | 1 | Small (subtly shifted to yellow) |
| Comp. ex. 1 | A + C (1:4 in weight) | 0.65 | 0.6 | Shifted to red yellow |
| Comp. ex. 2 | D + E (1:4 in weight) | 0.5 | 0.4 | Shifted to orange color |

Particle A: 0.5 μm $BaTiO_3$ core + ZnS:Mn coating
Particle B: 1.0 μm $BaTiO_3$ core + ZnS:Cu coating
Particle C: 0.5 μm $BaTiO_3$ core + ZnS:Cu coating
Particle D: ZnS:Mn particle (without core)
Particle E: ZnS:Cu, Cl particle (without core)

The Table 1 shows that the Device of Example 1 may produce higher brightness (i.e., higher luminous efficiency) than the Device of Comparative Example 1 and Device of Comparative Example 2 under the same driving conditions. The Device of Comparative Example 1 that uses particles A and C having the same dielectric constant produces higher brightness than the Device of Comparative Example 2 that uses particles D and E, each formed only of a fluorescent material, due to the field concentration effect of the dielectric cores, but falls short of the Device of Example 1. The reason for this might be that the Device of Example 1 uses dielectric cores, each having a different dielectric constant in accordance with the fluorescent material of the fluorescent coating layer, thereby voltage distribution was optimized and each of the fluorescent materials performed sufficiently well, while the Device of Comparative Example 1 uses dielectric cores having the same dielectric constant regardless of the type of fluorescent materials used so that each of the fluorescent materials did not performed well.

In addition, a test for evaluating the change in brightness and color was also conducted. In the test, each of the three devices described above was driven by the voltage that drives the device to produce luminescence with the initial brightness of 100 cd/m2 using an AC power source of 1 KHz. Then, the change in brightness and color was evaluated for the three devices after they had been continuously activated for one month under the ambient temperature of 25 degrees Celsius and relative humidity of 50%. The evaluation results are also shown in Table 1. The "relative brightness after duration of test" indicates the relative values with reference to the value of the Device of Example 1, which is defined as 1, showing the ratio of the measured brightness to the initial brightness of 100 cd/m² after one month.

The result shows that the change in the brightness after one month in the Device of Example 1 is the least among the three devices. Also, the change in the color was subtle in the Device of Example 1, which was recognizable as white luminescence though it slightly shifted to yellow. On the other hand, the luminescent color of the Device of Comparative Example 1 shifted from white to red yellow, and that of the Device of Comparative Example 2 shifted to orange color. This might prove that the change in the color was kept smaller in the Device of Example 1 due to the selection of an appropriate dielectric constant for each of the dielectric cores in accordance with the difference in deterioration pattern of the emission lifetime of each of the fluorescent materials so that the fluorescent materials for forming fluorescent coating layers of respective luminescent particles have a substantially identical deterioration pattern of the emission lifetime, compared with the conventional method which is based only on the adjustment of the emission power of each of the fluorescent materials and the mixture ratio of the particles.

Further, another test for evaluating the change in the luminescent color was also conducted. In the test, the driving conditions of the three devices described above were varied, that is, the driving voltage from 100V to 300V and the power supply frequency from 60 Hz to 5 KHz. The result shows that the Device of Comparative Example 1 and Device of Comparative Example 2 change the luminescent color significantly with the change in the voltage and frequency. On the other hand, the change in the luminescent color of the Device of Example 1 was extremely small compared with the Device of Comparative Example 1 and Device of Comparative Example 2. This might prove that, in the Device of Example 1, selection of an appropriate dielectric constant for each group of the dielectric cores in accordance with the difference in voltage-brightness characteristics between the fluorescent materials so that the particle group of particles A and particle group of particles B have substantially identical apparent voltage-brightness characteristics allowed the device to produce a desired luminescent color stably under the various driving conditions and over a wide range of brightness.

Figure 3:
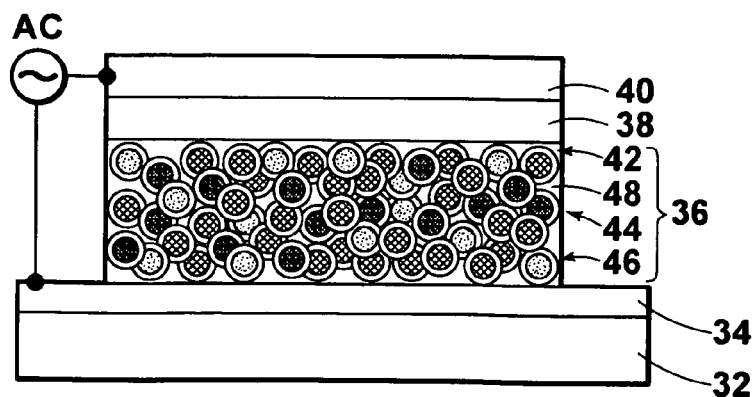
FIG. 3 is a sectional view of the electroluminescence device according to a second embodiment of the present invention illustrating the structure thereof.

Hereinafter, the electroluminescence device according to a second embodiment of the present invention will be described with reference to FIG. 3.

The electroluminescence device 30 according to the second embodiment of the present invention comprises a transparent substrate 32, a transparent electrode 34, a luminescent layer 36, an insulation layer 38, and a back plate electrode 40, as with the device 10 shown in FIG. 1.

In the present embodiment, the luminescent layer 36 has three different types of particles 42, 44 and 46 distributed in a binder 36 in multitude. Each of the three types of luminescent particles 42, 44 and 46 is a particle having both a dielectric core and a fluorescent coating layer. For each of the three types of particles 42, 44 and 46, a fluorescent material that produces the same luminescent color is used. On the other hand, a dielectric material having a different dielectric constant with each other is used for each of the particles 42, 44 and 46. The dielectric material having an appropriate dielectric constant is selected for each of these dielectric cores so that the total voltage-brightness characteristics of the three different types of luminescent particles 42, 44 and 46, that is, the change in the brightness of the luminescence of the entire luminescent layer 36 for the change in the voltage applied to the luminescent layer 36 becomes relatively moderate.

The preferable material and dimensions of each component of the device 30, and preferable method for forming the luminescent particles 42, 44 and 46 are identical to those of the device 10 according to the first embodiment described above.

Hereinafter, the operation and function of the electroluminescence device 30 will be described. When an AC voltage is applied between the transparent electrode 34 and back plate electrode 40, recombination of donors and accepters, or collision excitation of the luminescent centers by hot electrons occurs within the fluorescent coating layers of the luminescent particles 42, 44 and 46, thereby luminescent emissions are produced. The luminescent emissions produced in this manner exit from the downside of the drawing in FIG. 3 through the transparent electrode 34 and transparent substrate 32.

When the luminescent emissions are produced, the voltage applied to the luminescent layer 36 is concentrated on the fluorescent coating layers of luminescent particles 42, 44 and 46 effectively by the effect of the dielectric cores of the luminescent particles 42, 44 and 46, so that luminescence of high brightness and efficiency may be obtained. In addition, if the dielectric material for forming each of the dielectric cores of the particles 42, 44 and 46 is selected so that the change in the brightness of the luminescence of the entire luminescent layer 36 for the change in the voltage applied to the luminescent layer 36 becomes moderate, the gradation may be finely controlled to represent a delicate gradation sequence.

Next, the verification test results of the aforementioned operation and function will be described. The test was conducted using an example device of the device 30 shown in FIG. 3 and a device of comparative example actually created.

In general, the example device of the device 30 was created using the same method as that of the Device of Example 1 described above. As for the luminescent particle 42, a dielectric core of $BaTiO_3$ having a relative dielectric constant of 2000, which is the same as that of the particle A used in the Device of Example 1 described above, with a fluorescent coating layer of ZnS:Mn coated thereon was used. As for the luminescent particle 44, a dielectric core of $BaTiO_3$ having a relative dielectric constant of 6000 with a fluorescent coating layer of ZnS:Mn coated thereon, which was formed by the same method as that of the particle A, was used. As for the luminescent particle 46, a dielectric core of $SrTiO_3$ (strontium titanate) having a relative dielectric constant of 900 with a fluorescent coating layer of ZnS:Mn coated thereon, which was formed by the same method as that of the particle A, was used. The mixture ratio of the luminescent particles 42, 44 and 46 was adjusted to 1:1:1 in weight. The thickness of the luminescent layer and that of the insulation layer were adjusted to 10 μm and 8 μm respectively. Hereinafter, the example device of the electroluminescence device 30 shown in FIG. 3, which was produced in the manner described above, will be referred to as the Device of Example 2.

The device of the comparative example was created by the method similar to that used to create the Device of Comparative Example 2, in which only the luminescent particles identical to the particles A (i.e., particles identical to the particles 42 of the Device of Example 2) were distributed in the luminescent layer. Hereinafter, the device created in this manner described above will be referred to as the Device of Comparative Example 3.

The amount of fluorescent material was adjusted between the Device of Example 2 and the Device of Comparative Example 3 so that they have the same amount of luminescent material per unit area of the luminescent layer.

The voltage-brightness characteristics of the Device of Example 2 and Device of Comparative Example 3 were evaluated. The evaluation result shows that the voltage adjustment range required for changing the brightness of the luminescence from 10 $cd/m_2$ to 500 $cd/m_2$ was around 50V for the Device of Comparative Example 3, but as wide as 150V for the Device of Example 2. That is, the change in the brightness of the Device of Example 2 is slower than that of the Device of Comparative Example 3, so that the gradation may be more finely controlled and a delicate gradation sequence may result.

Hereinafter, the electroluminescence device according to a third embodiment of the present invention will be described with reference to FIG. 4.

The electroluminescence device 50 according to the third embodiment of the present invention is applicable to multi-color representation. As shown in FIG. 4, it comprises a single transparent substrate 52, a single transparent electrode 54, two luminescent layers 56a and 56b, two insulation layers 58a and 58b, and two back plate electrodes 60a and 60b. The device 50 is formed such that AC voltages are applied between the transparent electrode 54 and back plate electrode 60a, and between the electrode 54 and back plate electrode 60b separately.

The luminescent layer 56a has electroluminescent particles 62a distributed in a binder 64a. Likewise, the luminescent layer 56b has electroluminescent particles 62b distributed in a binder 64b. The fluorescent material forming the fluorescent coating layer of the luminescent particle 62a and that of the luminescent particle 62b produce different luminescent colors with each other, which are selected in accordance with desired multicolor representation. The dielectric core of the luminescent particle 62a and that of the luminescent particle 62b are formed using dielectric materials having different dielectric constants with each other. The dielectric materials forming respective dielectric cores are selected based on the difference in voltage-brightness characteristics and/or a deterioration pattern of the emission lifetime between the fluorescent materials forming the respective fluorescent coating layers, and have appropriate dielectric constants so that the entire luminescent layers 56a and 56b have substantially identical apparent voltage-brightness characteristics and/or a deterioration pattern of the emission lifetime.

The preferable material and dimensions of each component of the device 50, and preferable method for forming the luminescent particles 62a and 62b are identical to those of the device 10 according to the first embodiment described above.

Hereinafter, the operation and function of the electroluminescence device 50 will be described. When AC voltages are applied between the transparent electrode 54 and back plate electrode 60a, and between the transparent electrode 54 and back plate electrode 60b in accordance with the color to be produced, recombination of donors and accepters, or collision excitation of the luminescent centers by hot electrons occurs within the fluorescent coating layers of the luminescent particles 62a and 62b, and luminescent emissions are produced. The respective luminescent emissions produced in the respective luminescent layers 56a and 56b exit from the downside of the drawing in FIG. 4 through the transparent electrode 54 and transparent substrate 52. These luminescent emissions produced in the luminescent layers 56a and 56b are mixed together, and a desired luminescent color is observable to the eyes of the observer.

When the luminescent emissions are produced, the voltages applied to the luminescent layers 56a and 56b are concentrated on the fluorescent coating layers of the luminescent particles 62a and 62b effectively by the effect of the dielectric cores of the luminescent particles 62a and 62b, so that the luminescence of high brightness and efficiency may be obtained. In addition, if the dielectric material for forming each of the dielectric cores of the particles 62a and 62b is selected so that the entire luminescent layers 56a and 56b have substantially identical apparent voltage-brightness characteristics, the voltage levels to be applied to the luminescent layers 56a and 56b may correspond substantially with each other, thereby the heavy circuit load may be prevented. Further, if the dielectric material for forming each of the dielectric cores of the particles 62a and 62b is selected so that the entire luminescent layers 56a and 56b have a substantially identical deterioration pattern of the emission lifetime, the change in the luminescent color of the entire device 50 over time under the same driving conditions may be prevented, thereby desired multicolor representation may be maintained over a prolonged period of time.

Figure 4:
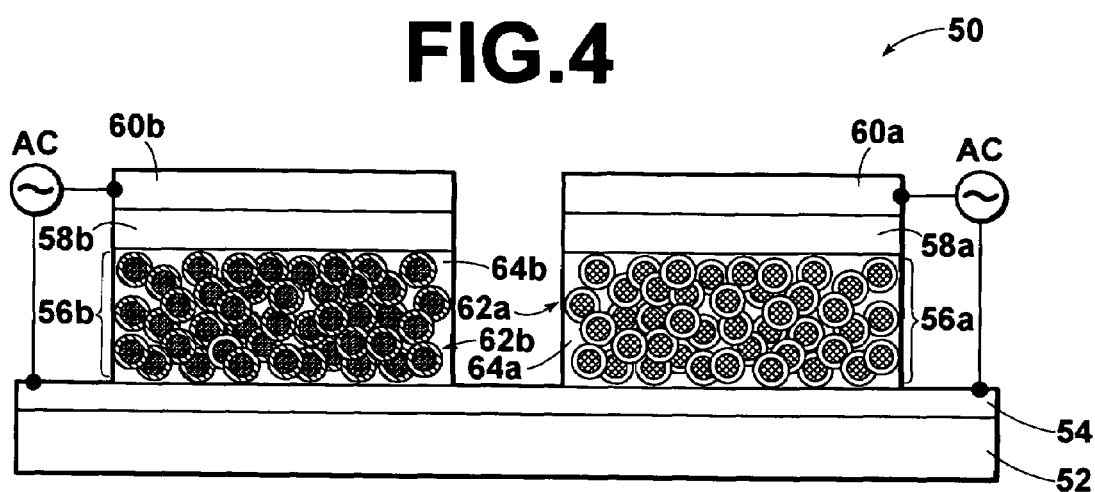
FIG. 4 is a sectional view of the electroluminescence device according to a third embodiment of the present invention illustrating the structure thereof.

The device 50 shown in FIG. 4 has a section comprising the luminescent layer 56a, insulation layer 58a, and back plate electrode 60a, and a section comprising the luminescent layer 56b, insulation layer 58b, and back plate electrode 60b disposed in parallel. But the device 50 may be constructed such that the sections described above are stacked in layers. In this case, the components, such as an electrode, disposed between the two luminescent layers need to be formed using transparent materials, and the luminescent emissions produced in respective luminescent layers need to exit from the device in mixed state.

Further, the device 50 shown in FIG. 4 has two luminescent layers 56a and 56b, each producing a different luminescent color. But the device may have three or more luminescent layers. For example, the device 50 may be a device for providing multicolor representation based on the three primary colors of R, G and B by having three luminescent layers that produce red, green and blue luminescent emissions respectively.

Still further, the device 50 shown in FIG. 4 has two luminescent layers 56a and 56b, each comprising a single type of electroluminescent particles distributed therein. But a plurality of different types of electroluminescent particles having dielectric cores of different dielectric constants may be distributed in each of the luminescent layers. In this case, a greater flexibility in luminescent color control, prevention of luminescent color change over time, and/or representation of a delicate gradation sequence may be allowed for each color which is an element of the multicolor representation.

The embodiments of the electroluminescent device of the present invention have been described in detail. But these embodiments are for illustration purposes only, and various modifications may be made without departing from the technical scope of the present invention.

For example, each type of the electroluminescent particles used in the devices according to the embodiments described above is formed only of a dielectric core and a fluorescent coating layer. But it may further have a dielectric coating layer outside of the fluorescent coating layer covering a part or whole of the fluorescent coating layer. Providing such a layer may protect the fluorescent material, which is, in general, sensitive to damp and moisture, from the ambient moisture, thereby the operation life of the device may be extended. Further, the electroluminescent particle having additional layers, such as a buffer layer, a surface protecting layer and the like, may also be used.

Further, the layer structures of the devices according to the embodiments described above are also only illustrative examples. The electroluminescence devices having at least electrodes and a luminescent layer may be included in the technical scope of the present invention. Conversely, the electroluminescence device of the present invention may have more layers than the devices according to the embodiments described above. For example, it may have a buffer layer and a surface protection layer, and an insulation layer may be provided on both sides of the luminescent layer.

Each of the layers comprising the electroluminescence device of the present invention may be formed by any known method. Preferably, however, all of the layers are formed by a simple method, such as coating, screen printing, or the like, rather than by vacuum deposition from the viewpoint of manufacturing cost.

Hereinafter, a display unit according to an embodiment of the present invention will be described with reference to FIGS. 5 and 6.

Figure 5:
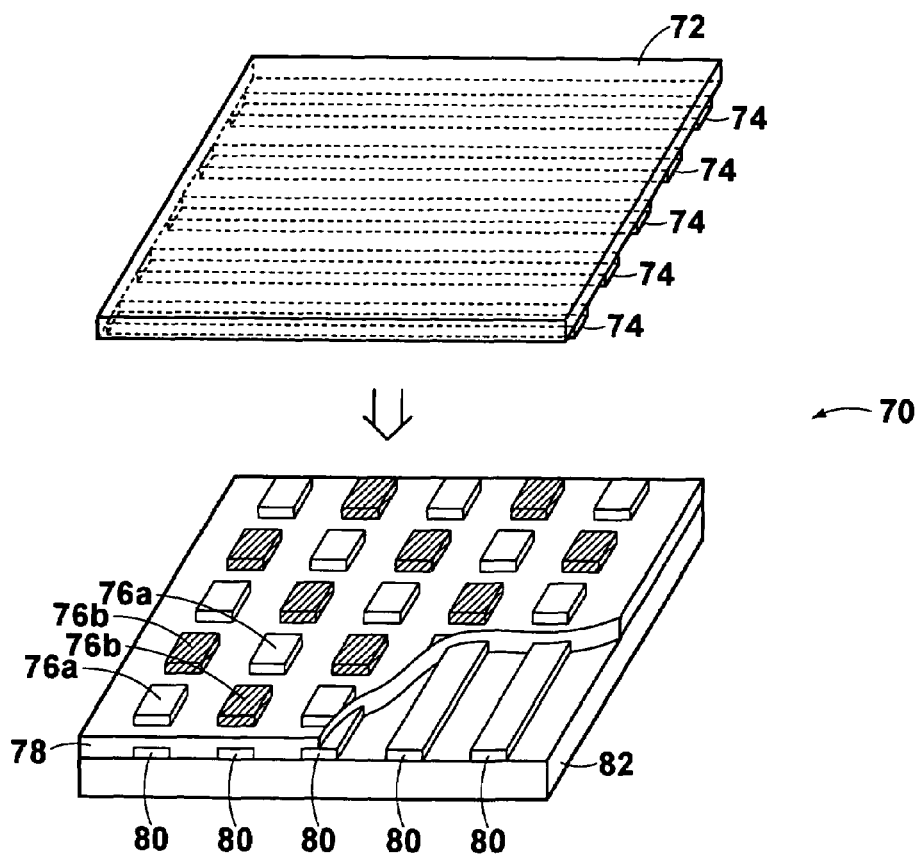
FIG. 5 is a perspective view of the display of the display unit according to an embodiment of the present invention illustrating the structure thereof.

FIG. 5 is a perspective view of a display 70 of the display unit according to the present embodiment illustrating the structure thereof. The display 70, in general, employs two sets of parallel electrodes disposed in orthogonal with each other, which is typically known as the X-Y matrix structure. More specifically, the display 70 comprises a transparent substrate 72, a group of transparent parallel electrodes 74, luminescent elements 76a and 76b disposed in checkered pattern, an insulation layer 78, a group of parallel back plate electrodes 80 disposed in orthogonal to each of the transparent parallel electrodes, and a back plate 82 stacked in this order. In FIG. 5, the display 70 is shown in two parts separated between the group of transparent parallel electrodes 74 and the luminescent elements 76a and 76b, and a part of the insulation layer 78 is broken in order to facilitate the description. Each of the luminescent elements 76a and 76b is disposed on each of the intersections of the transparent parallel electrodes 74 and parallel back plate electrodes 80.

FIGS. 6A and 6B are enlarged sectional views of the luminescent elements 76a and 76b respectively. The luminescent element 76a has electroluminescent particles 84a distributed in a binder 86a, each formed of a dielectric core and a fluorescent coating layer. Likewise, the luminescent element 76b has electroluminescent particles 84b distributed in a binder 86b, each formed of a dielectric core and a fluorescent coating layer. The fluorescent material forming the fluorescent coating layer of the luminescent particle 84a and that of the luminescent particle 84b produce different luminescent colors with each other, which are selected in accordance with desired multicolor representation. The dielectric core of the luminescent particle 84a and that of the luminescent particle 84b are formed using dielectric materials having different dielectric constants with each other. The dielectric materials forming respective dielectric cores are selected based on the difference in voltage-brightness characteristics and/or deterioration pattern of the emission lifetime between the fluorescent materials forming the respective fluorescent coating layers, and have appropriate dielectric constants so that the entire luminescent elements 76a and 76b have substantially identical apparent voltage-brightness characteristics and/or a deterioration pattern of the emission lifetime.

The display 70 described above may be created, for example, by the following method. First, forming the transparent parallel electrodes 74 made of ITO on the transparent substrate 72 made of PET sheet, which correspond to the upper part of the display 70 shown in FIG. 5. Providing separately the back plate 82 made of PET sheet with white pigment mixed therein for scattering the reflections, and forming the parallel back plates 80 made of aluminum on the back plate 82. Then, forming the insulation layer 78 on the back plate 82 and parallel back plate electrodes 80 by coating a paste made of a composite binder made of cyanoethyl polyvinyl alcohol and cyanoethyl pullulan with, for example, particles of $BaTiO_3$ having an average particle diameter of 200 nm distributed therein. Disposing the luminescent elements 76a and 76b in checkered pattern on the insulation layer by pattern printing of the pastes alternately, each including therein, for example, particles A or B used in the Device of Example 1 described above, in accordance with the pitch of the transparent parallel electrodes 74 and parallel back plate electrodes 80. Placing the upper part of the display 70 described above on the lower part of the display 70 shown in FIG. 5 created in the manner described and bonding them together by hot pressing. Preferably, the entire display 70 is sealed by a moisture-proof film.

The display 70 of the display unit according to the present embodiment is operated by sequentially applying an AC voltage between each of the transparent parallel electrodes 74 and each of the parallel back plate electrodes 80 in accordance with a desired pattern to be displayed. The luminescent emissions produced in each of the luminescent elements 76a and 76b exit from the upside of the drawing in FIG. 5 through the transparent parallel electrodes 74 and transparent substrate 72. The voltage application between each of the transparent parallel electrodes 74 and each of the parallel back plate electrodes 80 is implemented through an extremely high speed scanning and a multicolored desired pattern is observable to the eyes of the observer.

The display 70 of the display unit according to the present embodiment employs an electrode structure of X-Y matrix and some of the components, such as the electrodes, are physically shared by a plurality of luminescent elements. But, if a section including a set of adjacent luminescent particles 76a and 76b is viewed as a single device, then the display may be regarded as a multicolor display comprising a multitude of electroluminescent devices similar to the device 50 shown in FIG. 4 is disposed two-dimensionally. Accordingly, the display unit of the present invention may receive the full benefits similar to those described above in relation to the electroluminescence device of the present invention.

The display 70 described above comprises a multitude of electroluminescence devices similar to the device 50 shown in FIG. 4 disposed therein. It is appreciated that the display unit having a display comprising a multitude of electroluminescent devices of the present invention disposed therein, each producing a single luminescent color, such as the device 10 shown in FIG. 1 or device 30 shown in FIG. 3, should also be included in the technical scope of the present invention.

What is claimed is:

1. An electroluminescence device, comprising:
   a luminescent layer having a multitude of electroluminescent particles distributed in a binder, said particles forming at least a first particle group and a second particle group; and
   electrodes for applying a voltage to said luminescent layer, wherein
   each of the electroluminescent particles forming said first particle group comprises a dielectric core having a first dielectric constant and a fluorescent coating layer made of a first fluorescent material, each of the electroluminescent particles forming said second particle group comprises a dielectric core having a second dielectric constant which is different from said first dielectric constant and a fluorescent coating layer made of a second fluorescent material,
   said first and second fluorescent materials are fluorescent materials that produce different luminescent colors from each other, and
   said first dielectric constant and said second dielectric constant are selected based on properties of the fluorescent coating layers, such that said first particle group and said second particle group have a substantially identical apparent voltage-brightness characteristic or a substantially identical deterioration pattern of an emission lifetime.

2. An electroluminescence device, comprising:
   a luminescent layer having a multitude of electroluminescent particles distributed in a binder, said particles forming at least a first particle group and a second particle group; and
   electrodes for applying a voltage to said luminescent layer, wherein
   each of the electroluminescent particles forming said first particle group comprises a dielectric core having a first dielectric constant and a fluorescent coating layer made of a first fluorescent material,
   each of the electroluminescent particles forming said second particle group comprises a dielectric core having a second dielectric constant which is different from said first dielectric constant and a fluorescent coating layer made of a second fluorescent material, and
   said first and second fluorescent materials are fluorescent materials that produce the same luminescent color.

3. The electroluminescence device according to claim 1, wherein a dielectric coating layer is further provided outside of said fluorescent coating layer made of said first fluorescent material and/or outside of said fluorescent coating layer made of said second fluorescent material.

4. The electroluminescence device according to claim 2, wherein a dielectric coating layer is further provided outside of said fluorescent coating layer made of said first fluorescent material and/or outside of said fluorescent coating layer made of said second fluorescent material.

5. An electroluminescence device, comprising:
   at least two luminescent layers arranged in parallel or stacked in layers that produce different luminescent colors with each other; and
   electrodes for applying voltages to said at least two luminescent layers separately, wherein
   a first luminescent layer of said at least two luminescent layers has a multitude of electroluminescent particles distributed in a binder, said particles forming at least a first particle group, and each of the electroluminescent particles forming said first particle group comprising a dielectric core having a first dielectric constant and a fluorescent coating layer made of a first fluorescent material, a second luminescent layer of said at least two luminescent layers has a multitude of electroluminescent particles distributed in a binder, said particles forming at least a second particle group, and each of the electroluminescent particles forming said second particle group comprising a dielectric core having a second dielectric constant which is different from said first dielectric constant and a fluorescent coating layer made of a second fluorescent material that produces a luminescent color which is different from that of said first fluorescent material, and
   said first dielectric constant and said second dielectric constant are selected based on properties of the fluorescent coating layers, such that said first particle group and said second particle group have a substantially identical apparent voltage-brightness characteristic or a substantially identical deterioration pattern of an emission lifetime.

6. The electroluminescence device according to claim 5, wherein a dielectric coating layer is further provided outside of said fluorescent coating layer made of said first fluorescent material and/or outside of said fluorescent coating layer made of said second fluorescent material.

7. A display unit, comprising a display having a multitude of electroluminescence devices arranged two-dimensionally, wherein each of the electroluminescence devices comprises:

a luminescent layer having a multitude of electroluminescent particles distributed in a binder, said particles forming at least a first particle group and a second particle group; and electrodes for applying a voltage to said luminescent layer, wherein each of the electroluminescent particles forming said first particle group comprises a dielectric core having a first dielectric constant and a fluorescent coating layer made of a first fluorescent material, each of the electroluminescent particles forming said second particle group comprises a dielectric core having a second dielectric constant which is different from said first dielectric constant and a fluorescent coating layer made of a second fluorescent material, said first and second fluorescent materials are fluorescent materials that produce different luminescent colors from each other, and said first dielectric constant and said second dielectric constant are selected based on properties of the fluorescent coating layers, such that said first particle group and said second particle group have a substantially identical apparent voltage-brightness characteristic or a substantially identical deterioration pattern of an emission lifetime.

8. A display unit, comprising a display having a multitude of electroluminescence devices arranged two-dimensionally, wherein each of the electroluminescence devices comprises:

a luminescent layer having a multitude of electroluminescent particles distributed in a binder, said particles forming at least a first particle group and a second particle group; and electrodes for applying a voltage to said luminescent layer, wherein each of the electroluminescent particles forming said first particle group comprises a dielectric core having a first dielectric constant and a fluorescent coating layer made of a first fluorescent material, each of the electroluminescent particles forming said second particle group comprises a dielectric core having a second dielectric constant which is different from said first dielectric constant and a fluorescent coating layer made of a second fluorescent material, and said first and second fluorescent materials are fluorescent materials that produce the same luminescent color.

9. The display unit according to claim 7, wherein a dielectric coating layer is further provided outside of said fluorescent coating layer made of said first fluorescent material and/or outside of said fluorescent coating layer made of said second fluorescent material.

10. The display unit according to claim 8, wherein a dielectric coating layer is further provided outside of said fluorescent coating layer made of said first fluorescent material and/or outside of said fluorescent coating layer made of said second fluorescent material.

11. A display unit, comprising a display having a multitude of electroluminescence devices arranged two-dimensionally, wherein each of said electroluminescence devices comprises:

at least two luminescent layers arranged in parallel or stacked in layers that produce different luminescent colors with each other; and electrodes for applying voltages to said at least two luminescent layers separately, wherein a first luminescent layer of said at least two luminescent layers has a multitude of electroluminescent particles distributed in a binder, said particles forming at least a first particle group, and each of the electroluminescent particles forming said first particle group comprising a dielectric core having a first dielectric constant and a fluorescent coating layer made of a first fluorescent material, a second luminescent layer of said at least two luminescent layers has a multitude of electroluminescent particles distributed in a binder, said particles forming at least a second particle group, and each of the electroluminescent particles forming said second particle group comprising a dielectric core having a second dielectric constant which is different from said first dielectric constant and a fluorescent coating layer made of a second fluorescent material that produces a luminescent color which is different from that of said first fluorescent material, and said first dielectric constant and said second dielectric constant are selected based on properties of the fluorescent coating layers, such that said first particle group and said second particle group have a substantially identical apparent voltage-brightness characteristic or a substantially identical deterioration pattern of an emission lifetime.

12. The display unit according to claim 11, wherein a dielectric coating layer is further provided outside of said fluorescent coating layer made of said first fluorescent material and/or outside of said fluorescent coating layer made of said second fluorescent material.

13. A method of manufacturing an electroluminescence device, said method comprising:

forming a first electrode on a substrate;

forming a luminescent layer on said first electrode such that said luminescent layer has a multitude of electroluminescent particles distributed in a binder, said electroluminescent particles form at least a first particle group and a second particle group, each of the electroluminescent particles forming said first particle group comprises a dielectric core having a first dielectric constant and a fluorescent coating layer made of a first fluorescent material, and each of the electroluminescent particles forming said second particle group comprises a dielectric core having a second dielectric constant which is different from said first dielectric constant and a fluorescent coating layer made of a second fluorescent material; and forming a second electrode such that said first electrode and said second electrode apply a voltage to said luminescent layer;

wherein said forming said luminescent layer comprises:

selecting said first fluorescent material and said second fluorescent material to produce different luminescent colors from each other; and selecting said first dielectric constant and said second dielectric constant based on properties of said fluorescent coating layers, such that said first particle group and said second particle group have a substantially identical apparent voltage-brightness characteristic or a substantially identical deterioration pattern of an emission lifetime.

14. A method of manufacturing an electroluminescence device, said method comprising:

forming a first electrode on a substrate;

forming a luminescent layer on said first electrode such that said luminescent layer has a multitude of electroluminescent particles distributed in a binder, said electroluminescent particles form at least a first particle group and a second particle group, each of the electroluminescent particles forming said first particle group comprises a dielectric core having a first dielectric constant and a fluorescent coating layer made of a first fluorescent material, and each of the electroluminescent particles forming said second particle group comprises a dielectric core having a second dielectric constant which is different from said first dielectric constant and a fluorescent coating layer made of a second fluorescent material; and forming a second electrode such that said first electrode and said second electrode apply a voltage to said luminescent layer;

wherein said forming said luminescent layer comprises selecting said first fluorescent material and said second fluorescent material to produce the same luminescent color.

* * * * *